United States Patent [19]

Nakagawa et al.

[11] 4,071,687
[45] Jan. 31, 1978

[54] ELECTRIC ARC FURNACE FOR CONTINUOUS MELTING OF DIRECTLY REDUCED IRON OR DIRECTLY REDUCED IRON ORE

[75] Inventors: Ryuichi Nakagawa, Seki; Shiro Yoshimatsu, Tokyo; Takuya Ueda, Zushi; Akira Fukuzawa, Yokohama; Tsuyoshi Ozaki, Tokyo; Akira Sato, Ohmiya; Tatsuro Mitsui, Sagamihara, all of Japan

[73] Assignee: National Research Institute for Metals, Tokyo, Japan

[21] Appl. No.: 667,173

[22] Filed: Mar. 15, 1976

[30] Foreign Application Priority Data

Mar. 17, 1975 Japan .................................. 50-31085
Mar. 17, 1975 Japan .................................. 50-31086
Mar. 17, 1975 Japan .................................. 50-31087
Mar. 17, 1975 Japan .................................. 50-31088

[51] Int. Cl.² .............................................. H05B 7/20
[52] U.S. Cl. ...................................................... 13/10
[58] Field of Search .............................. 13/10, 9, 9 ES

[56] References Cited

U.S. PATENT DOCUMENTS

| 2,279,990 | 4/1942 | Hopkins | 13/9 ES |
| 2,406,147 | 8/1946 | Hopkins | 13/10 |
| 3,950,601 | 4/1976 | Popov et al. | 13/10 X |

Primary Examiner—R. N. Envall, Jr.
Attorney, Agent, or Firm—Sherman & Shalloway

[57] ABSTRACT

A direct-heat arc furnace for the production of molten iron by continuously melting and reducing directly reduced iron or directly reduced iron ore, which comprises electrodes fixed in position and a furnace body to be driven so that the relative position of arc spots at the tips of the electrodes and the surface of the molten material in the furnace move continuously, and in which the shape and moving path of the furnace body are such that the range of tapping port movement is minimized and the melting of the feed stock and the tapping of the molten iron are performed continuously.

3 Claims, 9 Drawing Figures

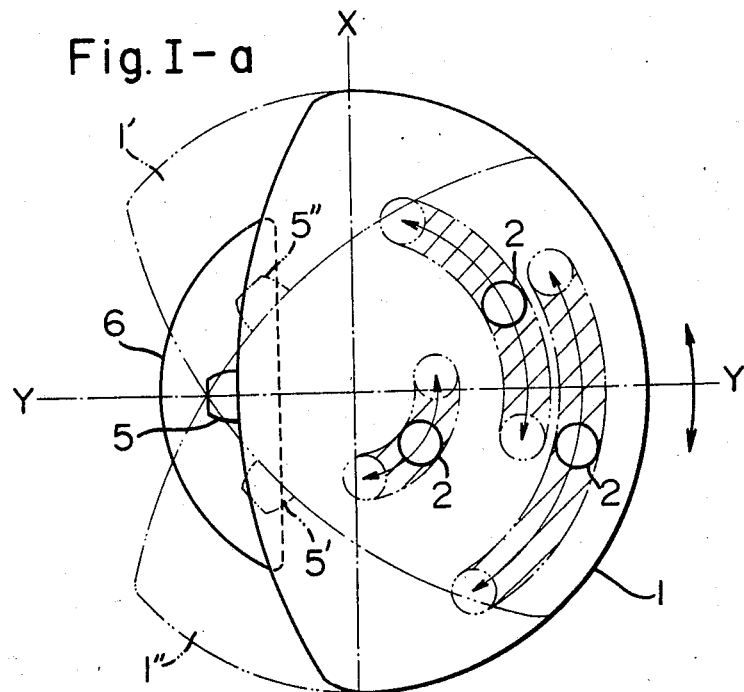
Fig. I-a
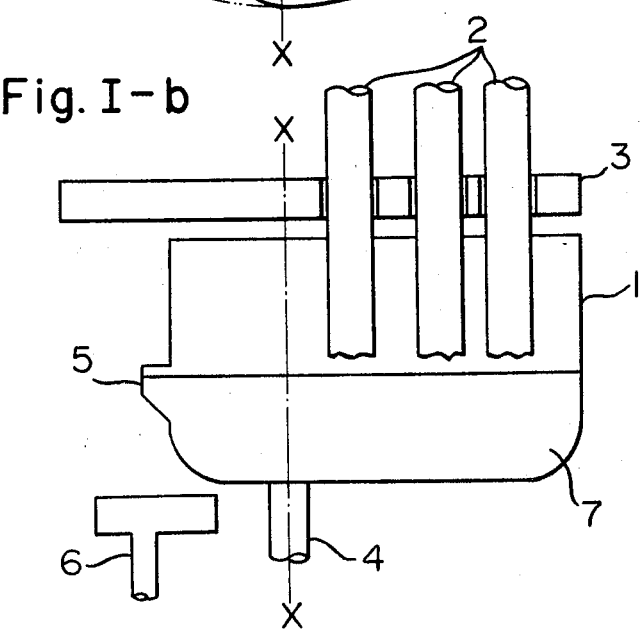
Fig. I-b

Fig. II-a
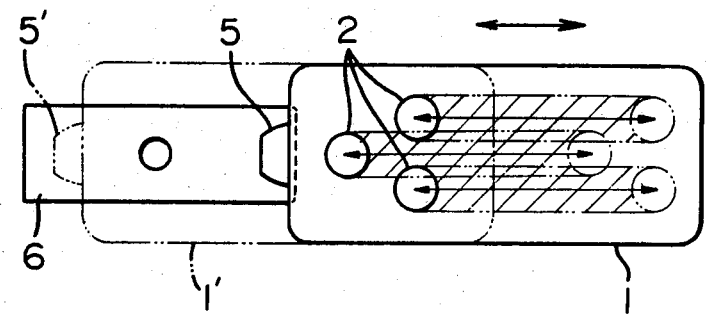
Fig. II-b
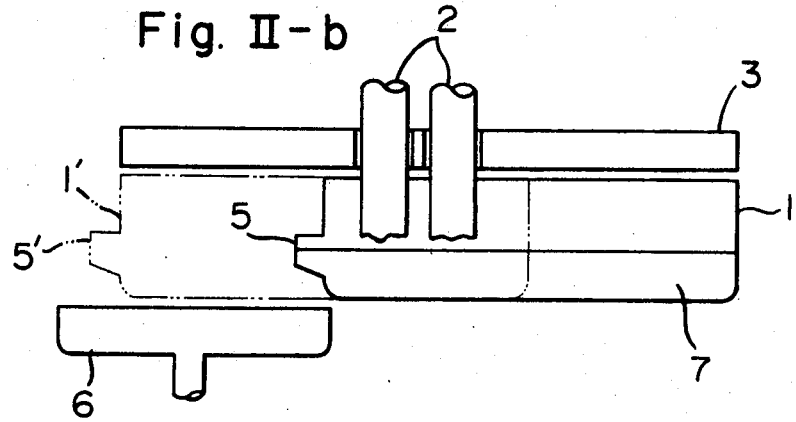

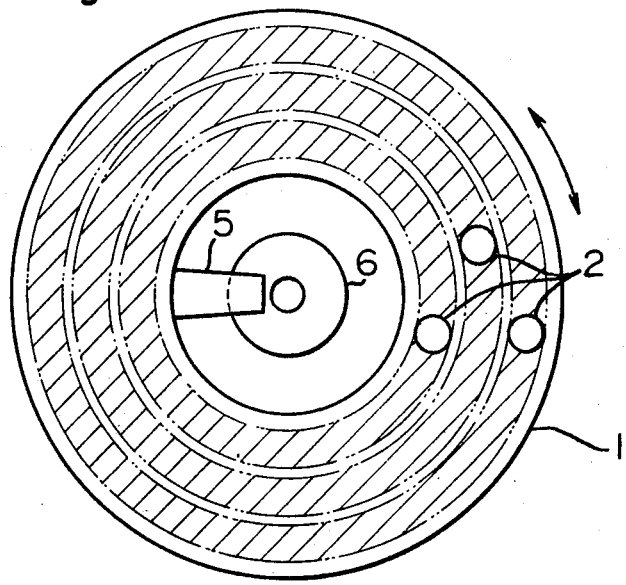
Fig. III-a
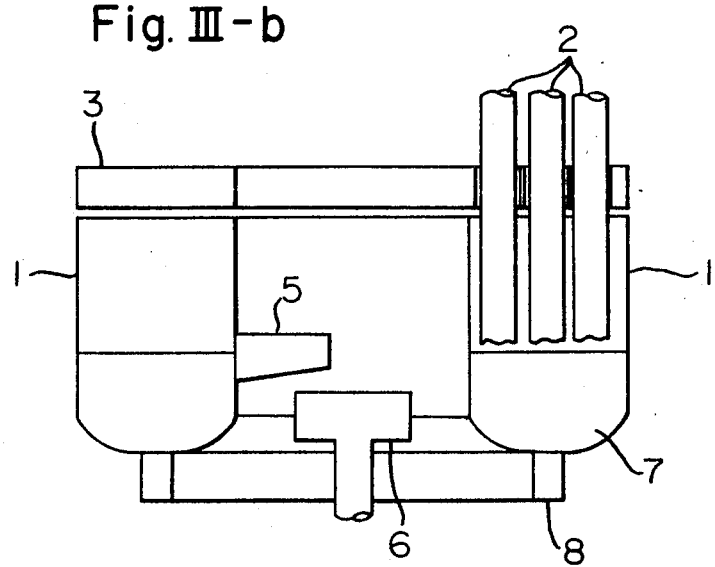
Fig. III-b

Fig. IV-a
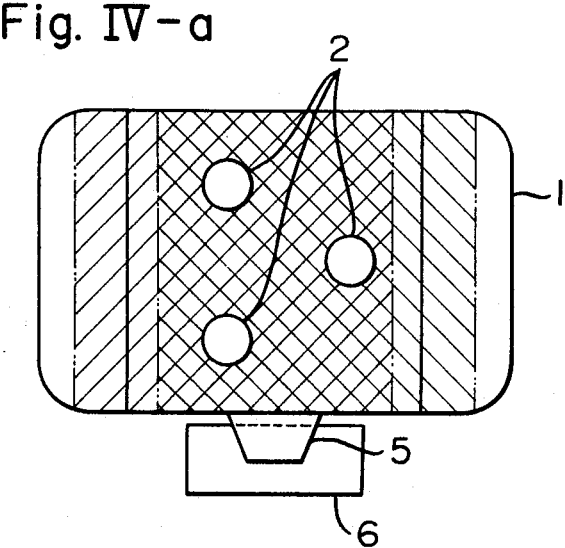
Fig. IV-b
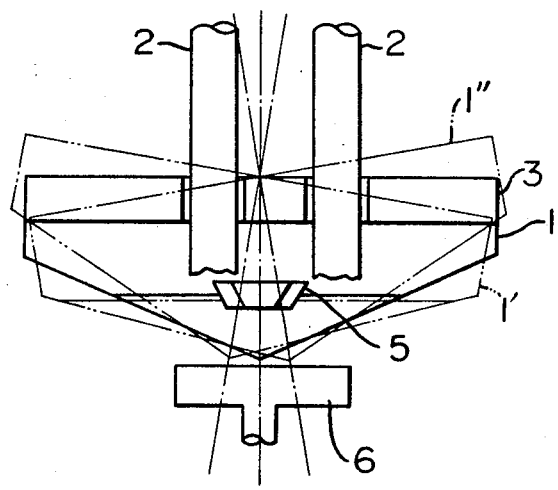

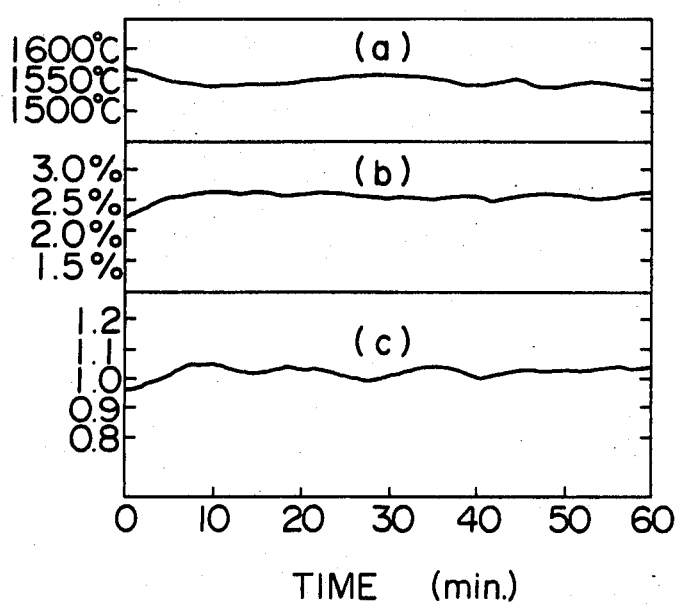
Fig. V

ELECTRIC ARC FURNACE FOR CONTINUOUS MELTING OF DIRECTLY REDUCED IRON OR DIRECTLY REDUCED IRON ORE

This invention relates to an electric arc furnace for the continuous production of molten iron by melting and reducing directly reduced iron or directly reduced iron ore. More specifically, it relates to a direct-heat arc furnace comprising electrodes fixed in position and a furnace body to be driven so that the relative positions of arc spots at the tips of the electrodes and the surface of a molten material in the furnace move continuously, in which the shape of the furnace body and its moving path are such that the range of tapping port movement is minimized and the melting of the feed stock and the withdrawal of the molten iron are performed continuously.

Attempts have been made in recent years to produce molten iron from directly reduced iron as a raw material. Directly reduced iron, pre-reduced iron, or more briefly, reduced iron is defined as the product of reduction of iron ores by means other than the blast furnace or conventional electric smelting. Usually, reduced iron is produced by reducing iron ore as a solid with a reducing agent, for example, a carbonaceous solid material such as coke, or a reducing gas such as hydrogen or carbon monoxide using a shaft furnace, rotary kiln, fluidized bed furnace, or the like, and then subjecting the reduced iron ore to post-treatments such as pulverizing, sieving and magnetic separation to separate the product from a greater portion of gangue minerals. The product contains a major amount of reduced metallic iron, a small amount of unreduced iron oxide and incidental gangue impurities. The total iron content of the reduced iron, although differing depending upon the manufacturing conditions and the gangue content, is usually about 85% to about 95%, and the iron is present in the form of metallic iron and iron oxide. The metallic iron expressed as a percentage of total iron is called the degree of metallization. In some cases, the reduced iron is present in the form of carbide, but it is included within the metallic iron. A product having a high degree of metallization, of course, contains a larger quantity of metallic iron. Usually, reduced iron is manufactured to a degree of metallization of about 65 to 85%, and the product contains about 10 to 20% by weight of iron oxide. Attempts to increase the degree of metallization results in a rapid decrease in the rate of reducing reaction and a greater consumption of energy, and this naturally leads to a great economic burden. On the other hand, when the degree of metallization is less than about 65%, the rate of reaction is higher, and the production is economically feasible. The resulting product, however, is of low grade with an iron oxide content of 20 to 30% or even more. Such a product which has been incompletely reduced is called directly reduced iron ore, or more briefly, reduced iron ore. There is no strict boundary between "reduced iron" and "reduced iron ore".

Unlike the melting of scrap iron, the production of molten iron from reduced iron suffers from various difficulties such as the bumping of the molten matter, and is still under development. The difficulty is greater with reduced iron of a higher iron oxide content. Accordingly, it is the current practice to use high grade reduced iron having an iron oxide content of as low as about 10 to 15% as a raw material. For example, one method in current use comprises melting high-grade reduced iron using a Heroult furnace comprising fixed electrodes and a fixed furnace body by a batchwise or semi-batchwise method similar to the case of melting scrap iron.

Generally, the melting of reduced iron or reduced iron ore cannot be free from an increase in electric power consumption as compared with the conventional scrap melting or steelmaking, and minimization of it is a great problem. One cause of the increased power consumption is ascribable to the physical properties of the reduced iron or reduced iron ore, for example, its porosity, and its chemical properties such as the presence of gangue impurities. Another great cause is that in the conventional methods, melting and reduction are carried out only in a high temperature zone immediately below the fixed electrodes, and consequently, the efficiencies of melting and reduction decrease.

Other difficulties associated with the melting and reduction of reduced iron by the conventional methods are described below.

According to the conventional techniques using an electric arc furnace comprising fixed electrodes and a fixed furnace body, the chemical compositions of a feed stock charged into the furnace tends to be influenced by variations in the operating conditions, and is difficult to maintain constant. For example, in the production of low carbon steel by adding reduced iron to molten pig iron to melt it, the two components cannot be uniformly mixed, and as a result, carbon contained in the pig iron abruptly reacts locally at high concentrations with oxygen in the oxides of the reduced iron, and this tends to result in an abnormal phenomenon such as the bumping of the molten material.

In the conventional semi-batchwise method, it is the practice to charge the feed stock continuously, and tap the molten iron batchwise. It would be possible to perform tapping continuously, but since the distribution of heat within the furnace is not uniform and the rate of melting is difficult to maintain constant, the amount of the molten iron to be tapped is difficult to maintain constant, and the non-uniformity of the composition of the tapped molten iron cannot be avoided. Uniformity of the temperature inside the furnace and of the composition of the molten iron can be attained by causing the flowing of the molten material within the furance. According to the conventional techniques, flowing can be caused by an electromagnetic induction method or a gas blowing method. The former can exert only a slow action, and since no renewal of the molten iron takes place, it takes time to attain uniformity. In the latter, the stability of arc cannot be ensured when the furnace used is an electric arc furnace that causes a foamed slag.

In a conventional electric arc furnace including fixed electrodes and a fixed furnace body, the damage of the furnace refractory cannot be avoided because of hot spots that are formed by the influences of an electrode which is near the inner wall of the furnace. This tendency is more remarkable in furnaces of high capacity.

The present invention provides a direct-heat arc furnace of a new type which is free from the various defects of the conventional furnaces, and which can be used to treat not only high-grade reduced iron but also low-grade reduced iron such as one having an iron oxide content of about 20% by weight and reduced iron ore containing about 30% of iron oxide. The direct-heat arc furnace is an electric furnace adapted to directly heat the material to be heated by an arc formed between electrodes and the material while generating some heat of resistance. This furnace includes two electrodes when the electric source is of single-phase, and three electrodes when it is of three-phase. In each of these cases, two or more sets of electrodes can be provided.

It is an object of this invention to provide an electric arc furnace capable of continuously producing molten iron of a uniform composition by melting and reducing reduced iron or reduced iron ore at constant temperatures.

Another object of this invention is to provide an electric arc furnace in which the efficiency of melting and reducing of reduced iron or reduced iron ore is increased, heat losses at the time of tapping are reduced and consequently, the electric consumption decreases, and the formation of hot spots in the refractory furnace wall is reduced to decrease the wear of the refractory material.

Still another object of this invention is to provide an electric arc furnace wherein the output of molten iron per furnace is increased by continuously melting and reducing reduced iron or reduced iron ore at uniform temperatures while maintaining the composition of the starting raw material uniform, and the amount of carbon monoxide generated by reduction is made substantially constant so as to make it easy to utilize the carbon monoxide effectively.

The above objects can be achieved in accordance with this invention by a direct-heat arc furnace for the continuous melting of directly reduced iron or directly reduced iron ore, said furnace comprising electrodes fixed in position, a furnace body to be driven so that it continuously repeats a horizontal half-turning reciprocal movement, a horizontal straight-line reciprocating movement, a horizontal rotating movement or a seesaw movement, a tapping port secured to the furnace body, and a tundish for receiving molten iron; wherein the movement of said furnace body continuously and repeatedly changes the positions of the arc spots at the tips of the electrodes relative to the upper surface of a feed stock of the reduced iron or reduced iron ore charged continuously into the furnace thereby to broaden the area within which to melt the charged stock, and to render the heat distribution within the furnace uniform, and wherein the shape of the furnace body and movement of the furnace body are such that the moving distance of the tapping port is equal to, or smaller than, the maximum distance of the relative movement of the arc spots and the upper surface of the feed stock.

One of the important characteristics of the present invention is that the cooperative effects of the continuous movement of the arc spot and the smooth movement of molten materials caused by continuous tapping permit the directly reduced iron or reduced iron ore charged to be melted smoothly and uniformly and therefore with a high efficiency of electric energy. Another important characteristic is that since the moving distance of the tapping port is minimized in spite of the movement of the furnace body, the molten iron tapped suffers from little heat losses and therefore, the efficiency of melting heat in the furnace is maintained extremely high. Still another characteristic of the present invention is that the molten iron is flowed naturally by the continuous tapping, and coupled with the rotation of the furnace body, the uniformity of the molten material can be attained sufficiently, and also the arc can be stabilized.

The structure and advantages of the furnace in accordance with this invention will be more easily understood from the following description taken in conjunction with the accompanying drawings showing some preferred embodiments of the furnace in accordance with the present invention.

FIGS. I-a to IV-a are horizontal sectional views illustrating four different embodiments of the furnace of the present invention.

FIGS. I-b to IV-b are, respectively, vertical sectional views of the four different embodiments shown in FIGS. I-a to IV-a, respectively.

FIG. V is a graph showing the results of experiments on the continuous melting of reduced iron usng one embodiment of the furnace of the present invention.

The reference numerals are common to all the figures, and the same numerals represent the same parts. The reference numeral 1 represents an inner wall of a furnace body; 2, an electrode; 3, a ceiling of a furnace; 4, a rotating shaft of the furnace; 5, a tapping port; 6, a tundish; 7, the position of the molten material in the furnace; and 8, a rail for rotating the furnace. All of these figures show furnace equipped with three electrodes using a three-phase electric source.

Type A

The furnace of type A in accordance with the present invention is shown in FIG. 1-a in its horizontal section and in FIG. I-b in its vertical section. The furnace wall 1, as shown by the solid line in FIG. I-a, is composed of two arcs having different radii of curvature. The arc shown on the right side of the line X—X in FIG. I-a is an arc of 180° having a smaller radius of curvature, and the arc on the left side thereof in an arc of less than 180° having a larger radius of curvature. The furnace body is rotated about the center of a circle having a smaller radius of curvature, a point at which the line X—X intersects the line Y—Y, or its vicinity as a rotating axis reciprocally and horizontally at an angle of about 45° both in the right and left directions, as shown by the arrow in FIG. 1-a. The position of the furnace body which has been rotated in one direction at an angle of about 45° is shown by the numeral 1', and its position after rotation at an angle of about 45° in the opposite direction is shown at 1", both indicated by a broken line. Rotation of the furnace is carried out by a suitable means, such as a geared motor on which the furnace body is placed, or a geared motor connected to the rotating shaft of the furnace via a change gear. The rotating shaft of the furnace is shown by numeral 4 in the lower part of FIG. 1-b.

The electrodes 2 and the furnace ceiling 3 are fixed in position. The three electrodes 2 are fixed in position above a zone of the furnace which is surrounded by the arc having a smaller radius of curvarture so that their tips face the surface of the charged stock in the furnace, and that the tips of the electrodes move relative to the surface of the charged stock as the furnace body moves horizontally and reciprocally at an angle of about 45° to draw arc-like paths shown by the hatched portions in FIG. I-a.

The tapping port 5 is projectingly secured to the center of the furnace wall in the arc having a larger radius of curvature, and moves with the horizontal rotating movement of the furnace body. It takes a position 5' when it has rotated to the left at an angle of 45°, and a position 5" when it has rotated to the right at an angle of 45°. The moving distance of the tapping port between 5' and 5" is of course smaller than the distance of the arc-like path drawn by the electrode 2 at the extreme right in FIG. I-a (the maximum among the arc-like paths drawn by the three electrodes). The tundish 6 is provided below the tapping port spaced apart from the furnace body so that it can receive the molten iron in response to the moving range of the tapping port 5.

Type B

The furnace of type B in accordance with this invention is shown in FIG. II-a in its horizontal section and in FIG. II-b in its vertical section. The horizontal section of the furnace body 1 is drawn rectangular in FIG. II-a, but if desired, it may be elliptic. The furnace body 1 is reciprocally and horizontally driven over a suitable distance in its longitudinal direction. The fixed electrodes 2 move relative to the surface of the charged stock in the furnace by the reciprocal movement of the furnace body to draw straight-like paths shown by the hatched portions in FIG. II-a. The tapping port 5 is provided projectingly at one end of the furnace body in its longitudinal direction, and takes a position 5' when the furnace body 1 has moved to the left in the drawing and reached a position 1' shown by a broken line. The moving distance of the tapping port between 5 and 5' is equal to the distances of the relative movements of the three electrodes (equal in this instance). The tundish 6 is provided below the tapping port spaced away from the furnace body so as to receive the molten iron correspondingly to the moving range of the tapping port.

Type C

The furnace of type C in accordance with this invention is shown in FIG. III-a in its horizontal section and in FIG. III-b in its vertical section. The furnace body 1 has an annular shape composed of two concentric circles, and is driven horizontal in one direction or rotated reciprocally in two opposite directions about the center of the concentric circles as a rotating axis. The fixed electrodes 2 move relative to the surface of the charged stock in the furnace with the rotating movement of the furnace body to draw circular paths shown by the hatched portions in FIG. III-a. Since the path drawn by each of the electrodes is circular, the electrodes move at different linear speeds. In other words, an electrode situated nearer the periphery of the annular furnace has a larger linear speed, and that portion of the charged stock which is present near the peripheral area of the annular furnace receives a less proportion of heat by the arc spot. Accordingly, it is desirable to position the electrodes so that the distance between the adjoining circular paths drawn by the electrodes becomes narrower as it approaches the periphery of the furnace, and that the supply of heat to the raw material in the furnace is equalized.

The tapping port 5 is secured projectingly to the inner circular wall of the furnace, and the tundish 6 is provided below the tapping port spaced away from the furnace body so as to receive the molten iron correspondingly to the moving range of the tapping port. Since the tapping port 5 is provided on the inner circular wall of the furnace, the moving distance of the tapping port is of course smaller than the distance of the circular path drawn by each of the electrodes. If the tapping port is provided on the outer circular wall of the furnace, its moving distance is naturally large, and consequently, the heat loss of the molten iron increases remarkably. The present invention can eliminate such a defect.

Type D

The furnace of type D in accordance with this invention is shown in FIG. IV-a in its horizontal section and in FIG. IV-b in its vertical section. The furnace body 1 in its horizontal section is rectangular or elliptic. The cross-section of the furnace bottom portion in a plane perpendicular to the minor axis of the horizontal section of the furnace body has a shape of an isosceles triangle. The furnace body 1 together with the furnace ceiling 3 is driven such that its major axis oscillates like a seesaw about a certain point on the bisecting line of the vertical angle of the triangle as a central axis. The fixed electrodes 2 move relative to the surface of the charged stock in the furnace with the oscillating movement of the furnace body 1. The inclining angle of the furnace body by oscillation is not critical, but usually, it is about 10° or its vicinity. FIG. IV-b shows the position of the furnace body that has inclined to the right at an angle of about 10° by reference numeral 1', and its position after inclination to the left at a angle of about 10° by reference numeral 1". The positions of the surface of the molten material within the furnace relative to the electrodes are shown in FIG. IV-a by hatchings in two different directions. The oscillating movement of the furnace body can be performed by a suitable means, for example, a hydraulic cylinder lifting mechanism fitted to the furnace body or a gear mechanism of an arc-shaped rack pinion fitted to the lower part of the furnace body. The tapping port 5 is secured projectingly to the central part of the furnace wall on one side of the furnace in its minor axis direction. The tundish 6 is provided below the tapping port spaced apart from the furnace body so as to receive the resulting molten iron. Thus, the moving distance of the tapping port with the oscillating movement of the furnace body is very small.

The various types of furnace in accordance with the present invention described above can treat directly reduced iron continuously and very smoothly and produce molten iron of a uniform composition with a high efficiency of electrical energy. These furnaces can be applied to directly reduced iron ore the treatment of which is impossible with the conventional furnaces.

The following Examples illustrate the present invention.

EXAMPLE 1

Molten iron was continuously produced by an arc furnace in accordance with the present invention, and for comparison, batchwise by a furnace of the same capacity.

The arc furnace used was of the type shown in FIG. I. The electric source was of single-phase, and the furnace had the following specification.
1. Amount of the molten iron residing in the furnace: about 170 Kg
2. Rotating speed of the furnace: corresponding to 0.1 rpm
3. Single-phase secondary voltage: 200 V
4. Secondary current: 1,500 A
5. Electrodes: Two graphite electrodes 75 mm in diameter Reduced iron pellets as a raw material contained the following ingredients (as found in % by weight).

Total Fe 96.8%; metallic Fe 86.3%; FeO 4.7%; $Fe_2O_3$ 9.7%; C 1.7%; Mn 0.030%; $SiO_2$ 1.4%.

In advance, reduced iron pellets were melted in the furnace, and coke was added to maintain the chemical composition and temperature of the molten iron at certain predetermined levels. Then, the continuous operation of the furnace was started, and the raw material was fed continuously and the resulting molten iron was continuously tapped at a certain fixed rate.

The reduced iron pellets were fed at a rate of 10 Kg/min., and the coke, at a rate of 1 Kg/min. Quick lime was added as a slag-forming material so as to maintain the basicity of the slag during the operation at 0.7 to 1.2. Furthermore, the slag was discharged continuously so as to maintain the thickness of the slag layer constant.

The batchwise operation for comparative purposes was carried out using the same type of furnace except that the furnace body was not rotated but fixed. The reduced iron pellets and coke were charged batchwise in the same proportions as in the continuous operation described above. Tapping was carried out intermittently.

The results of the above experiments are shown in the following tables amd FIG. V.

FIG. V shows the temperature of the molten iron [curve (a)], the carbon concentration in the molten iron [curve (b)], and the basicity of the slag [curve (c)] which changed with time during a 60-minute operation.

Table 1 below shows the energy efficiency and electric power consumption in the above experiments. It can be seen from Table 1 that the energy efficiency and electric power consumption in accordance with the continuous operation are better than those in the batchwise operation. This shows the superiority of the furnace of this invention over the conventional furnace.

Table 2 shows the degree of reduction of iron oxide in the starting reduced iron and the yield of iron in the above experiments. It can be seen that both the degree of reduction and the iron yield were better in the continuous operation in accordance with this invention than in the batchwise operation. This demonstrates that the furnace of this invention markedly increases the efficiency of melting and reducing reaction.

Table 1

|  | Energy efficiency (%) | Electric power consumption (KW h/ton) |
|---|---|---|
| Invention | 49.1 | 930 |
| Batchwise operation | 38.6 | 1150 |

Table 2

|  | Degree of metallization of iron oxide (%) | Yield of iron (%) |
|---|---|---|
| Invention | 96.7 | 99.7 |
| Batchwise operation | 78.0 | 97.9 |

The 60-minute continuous operation in the furnace of the present invention and the 60-minute batchwise operation described above were repeated five times, and then, the condition of the hot spots in the furnace was examined. In the batchwise operation, the magnesia stamp layer applied in advance to the surface of the inner wall of refractory bricks in the furnace was heavily corroded at those portions where the hot spots occurred. In contrast, in the continuous operation in accordance with this invention, the corrosion of portions corresponding to the hot spots was only slight. This fact demonstrates that in continuous operations using the furnace of the present invention, the corrosion of the refractory material of the furnace is very much reduced, and the life of the furnace is prolonged, and the operating efficiency can be improved.

EXAMPLE 2

The same experiment as in Example 1 was performed using reduced iron ore instead of the reduced iron as a feed stock.

The test electric arc furnace used was of the type shown in FIG. 1, and had the following specification. The electric source was of a single-phase.

1. Amount of molten iron residing in the furnace: About 170 Kg
2. Rotating speed of the furnace (rotation at an angle of 45° about the tapping port): corresponding to 0.3 rpm
3. Single-phase secondary voltage: 200 V
4. Secondary Current: 1500 A
5. Electrodes: two graphite electrodes with a diameter of 75 mm The feed stock was reduced iron ore having a degree of metallization of 62%, and had the following ingredients (as found in % by weight).

Total Fe 85.6%; metallic Fe 53.1%; FeO 27.1%; $Fe_2O_3$ 16.4%; C 1.3%; Mn 0.02%; $SiO_2$ 1.1%.

Before the start-up of the operation, pig iron and steel were molten in the furnace, and the chemical composition and temperature of the molten iron in the furnace were maintained at predetermined levels. Then, the continuous charging of the reduced iron ore and the continuous tapping of the resulting molten iron at a predetermined rate were started. During the operation, the reduced iron ore and coke were fed at a rate of 6 Kg/min. and 1.3 Kg/min., respectively. In order to maintain the basicity of the slag component during the operation at 0.7 to 1.2, quick lime as a slag-forming agent was charged. The slag was continuously discharged so as to maintain the thickness of the slag layer constant. The molten iron containing about 2.5% of carbon was separated from the slag by skimmering, and tapped continuously out of the furnace.

In the 60-minute operation, the temperature of the inside of the furnace was rendered substantially uniform throughout the entire zone, and the bumping of the molten material did not occur. The operation could be performed smoothly in good condition, and molten iron of a constant composition was taken out continuously.

On the other hand, when the same operation was performed while the furnace body was fixed without rotation, the temperature of the inside of the furnace did not become uniform on the whole, and the bumping of the molten material occurred frequently. Thus, continuous operation could not be performed smoothly in good condition.

What we claim is:

1. A direct-heat arc furnace for the continuous melting of directly reduced iron or directly reduced iron ore and continuous tapping of resulting molten iron, said furnace comprising:
    a furnace body which in its horizontal section has a shape surrounded by a furnace wall having a shape resulting from the connection of an arc of 180° having a smaller radius of curvature to an arc of less than 180° having a larger radius of curvature;
    a plurality of electrodes which are fixed above the furnace body and surrounded by the arc having a smaller radius of curvature so that the tips of the electrodes face the surface of the charged stock in the furnace;

means for causing a horizontal rotation of the furnace body continuously and repeatedly at an angle of about 45° both in one direction and in the opposite direction about the center of a circle forming the arc having a smaller radius of curvature or its vicinity as a rotating axis;

a tapping port which is secured projectingly to the center of the furnace wall of the arc having a larger radius of curvature; and a tundish which is disposed below the tapping port spaced apart from the furnace body so as to receive the resulting molten iron;

said continuous and repeated horizontal rotation of the furnace body serving to broaden the area within which to melt the continuously charged stock of the reduced iron or reduced iron ore and render the heat distribution within the furnace uniform, and said rotation of the furnace body of the defined shape in conjunction with the position of the tapping port, permitting the moving distance of the tapping port to be smaller than the maximum distance of the movement of the electrodes relative to the surface of the charged stock.

2. A direct-heat arc furnace for the continuous melting of directly reduced iron or directly reduced iron ore and continuous tapping of resulting molten iron, said furnace comprising:

a furnace body which has a rectangular or elliptical shape in its horizontal section;

a plurality of electrodes which are fixed in position above the furnace body so that the tips of the electrodes face the surface of the charged stock in the furnace;

means for causing a horizontal movement of the furnace body continuously and reciprocally in its major axis direction;

a tapping port which is secured projectingly to one end of the furnace body in the major axis direction of the furnace body; and a tundish which is disposed below the tapping port spaced apart from the furnace body so as to receive the resulting molten iron;

said continuous and reciprocal movement of the furnace body serving to broaden the area within which to melt the continuously charged stock of the reduced iron or reduced iron ore and render the heat distribution within the furnace uniform, and said position of the tapping port permitting the moving distance of the tapping port to be equal to the maximum distance of the movement of the electrodes relative to the surface of the charged stock.

3. A direct-heat arc furnace for the continuous melting of directly reduced iron or directly reduced iron ore and continuous tapping of resulting molten iron, said furnace comprising:

a furnace body which has a rectangular or elliptical shape in its horizontal section and the cross section of the furnace bottom in a plane perpendicular to the minor axis of the furnace body has a shape of an isosceles triangle;

a plurality of electrodes which are fixed in position above the furnace body so that the tips of the electrodes face the surface of the charged stock in the furnace;

means for causing a continuous seesaw-like oscillatory movement of the furnace body in its major axis direction about a point on the bisecting line of the vertical angle of said triangle at the center of the furnace as a central axis;

a tapping port which is secured projectingly to the central part of the furnace wall in the minor axis direction; and a tundish which is disposed below the tapping port spaced apart from the furnace body so as to receive the resulting molten iron;

said continuous seesaw-like oscillatory movement of the furnace body serving to broaden the area within which to melt the continuously charged stock of the reduced iron or reduced iron ore and render the heat distribution within the furnace uniform, and said position of the tapping port permitting the moving distance of the tapping port to be smaller than the maximum distance of the movement of the electrodes relative to the surface of the charged stock.

* * * * *